United States Patent
Leffingwell

[15] 3,676,504
[45] July 11, 1972

[54] PREPARATION OF A TEREPENE ALCOHOL

[72] Inventor: John C. Leffingwell, Winston-Salem, N.C.
[73] Assignee: R. J. Reynolds Tobacco Company, Winston-Salem, N.C.
[22] Filed: Sept. 10, 1970
[21] Appl. No.: 71,241

Related U.S. Application Data

[62] Division of Ser. No. 711,500, March 8, 1968, Pat. No. 3,609,197.

[52] U.S. Cl. ..........................................................260/631.5
[51] Int. Cl. ......................................C07c 35/18, C11b 9/00
[58] Field of Search................................................260/631.5

[56] References Cited

FOREIGN PATENTS OR APPLICATIONS 1,456,297  9/1966  France.............................260/631.5

OTHER PUBLICATIONS

" Simonsen, " The Terpenes," Vol. 1, 2nd ed. (1953), pp. 165– 167, 171, 275–278, QD 416S58.
Cram, " J. Am. Chem. Soc.," Vol. 84, (1962), pp. 1734–1735, QD1A5

*Primary Examiner*—Leon Zitver
*Assistant Examiner*—Joseph E. Evans
*Attorney*—Pendleton, Neuman, Williams & Anderson

[57] ABSTRACT

Synthesis of terpinene-4-ol from terpinolene.

1 Claim, No Drawings

PREPARATION OF A TEREPENE ALCOHOL

This application is a division of my copending application Ser. No. 711,500 filed Mar. 8, 1968 and now U.S. Pat. 3,609,197.

This invention relates to the synthesis of terpinene-4-ol. Terpinene-4-ol is an unsaturated tertiary terpene alcohol which occurs naturally in a number of essential oils. It finds use as a component in synthetic essential oils which are compounded for use as flavors or perfumes.

It is a principal object of the invention to provide a process for synthesizing terpinene-4-ol.

In accordance with the present invention terpinene-4-ol is synthesized using as the starting material terpinolene, which is a readily available hydrocarbon. Terpinolene is epoxidized to terpinolene epoxide which is then reacted with an amine to form the corresponding aminohydrin. The aminohydrin is then treated with an oxidizing agent to provide an oxide which on pyrolysis affords limonene-4-ol. Hydrogenation of limonene-4-ol affords terpinene-4-ol in high purity. The synthesis method of the present invention can be depicted by the following reactions:

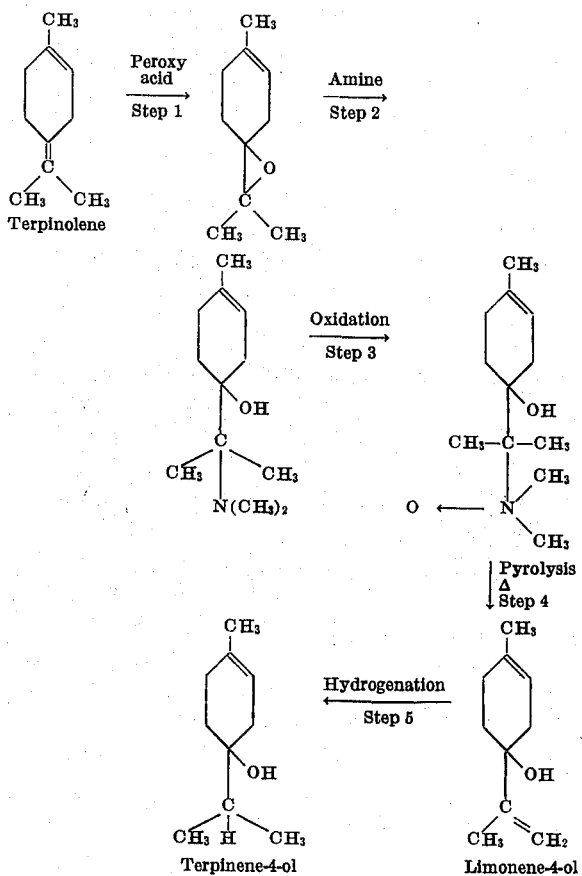

The epoxidation of step 1 of the synthesis is carried out conventionally using an organic peroxy acid such as peracetic, perpropionic, m-chloroperbenzoic and the like.

Step 2 of the synthesis involves reacting the terpinolene epoxide with a secondary amine; representative amines being dimethylamine, diethylamine, pyrrolidine, piperidine, morpholine and the like. This step is carried out at a temperature ranging from about 50° to 250° C., preferably 75° to 150° C. and at a pressure from atmospheric to 400 p.s.i.g. The reaction is usually complete in from 2 to 72 hours.

The aminohydrin product obtained from step 2 is then treated with an oxidizing agent such as hydrogen peroxide, peracetic acid, perbenzoic acid, perpropionic acid, m-chloroperbenzoic acid, ozone and the like. This oxidation is carried out at a temperature from about −50° to 100° C., preferably −50° to 40° C., and at atmospheric pressures for a period generally ranging from 10 minutes to 48 hours.

In step 4, the crude amine N-oxides are pyrolyzed by heating in liquid phase to temperatures ranging from 100° to 200° C. for a period of from 10 minutes to 4 hours. Alternatively, it has been shown [D.J. Cram, et al., *J. Am. Chem. Soc.*, 84, 1734 (1962)] that such amine oxides will decompose in dimethylsulfoxide at about 25°. Pyrolysis or decomposition results in the production of limonene-4-ol. The limonene-4-ol is then separated and subjected to catalytic hydrogenation under pressure. For this hydrogenation hydrogen is employed in an amount of about 1.3 percent by weight based on limonene-4-ol and temperatures ranging from 10° to 80° C. and pressures from 1 atmosphere to 10 atmospheres are employed. Catalysts which can be utilized are platinum, platinum oxide and palladium, Raney nickel and the like. As is known, the hydrogenation catalysts can be on supports such as alumina or carbon.

The following illustrates a preferred embodiment of the present invention: (Temperatures are in degrees centigrade.)

1. Epoxidation of Terpinolene

Peracetic acid (40 percent, 760 grams) was added dropwise to an agitating mixture of terpinolene (544 grams), methylene chloride (1,600 milliliters) and anhydrous sodium acetate (200 grams). The reaction temperature was held at about 6° C. by means of an external cooling bath. After addition of the peracid was complete, the reaction was stirred for one hour and then neutralized with 30 percent sodium hydroxide. The organic layers were separated, washed with water and dried over anhydrous magnesium sulfate. The solvent was stripped under reduced pressure to give an essentially quantitative amount of crude epoxide which exhibited only a single major peak on vapor phase chromatography. The crude epoxide gave a negative test for peroxides and was distilled over a cold-finger distillation head under reduced pressure. A distilled sample, boiling point 72°–75°/5 millimeters, weighing 556 grams (91 percent) was obtained which was identical in all respects to a known sample of terpinolene epoxide.

2. Reaction of Terpinolene Epoxide with Aqueous Dimethylamine

Terpinolene epoxide (205 grams) was heated at 130°–140° C. for 2.5 days with 40 percent aqueous dimethylamino (400 milliliters) in a Parr pressure apparatus. During the reaction period the pressure rose to about 200 p.s.i.g. The crude reaction product was extracted with ether and water washed. After drying over magnesium sulfate the solvent was stripped to give 250 grams (94 percent) of terpinolene-N,N-dimethylaminohydrins.

3. Reaction of Terpinolene-N,N-dimethylaminohydrins with Hydrogen Peroxide.

The crude terpinolene-N,N-dimethylaminohydrins (197 grams) obtained in the preceding step were dissolved in methanol (300 milliliters) and agitated at room temperature while adding hydrogen peroxide (50 percent, 286 milliliters). The reaction mixture was stirred for 30 hours at room temperature and then a portion of 10 percent palladium on carbon (1.5 grams) was added to destroy excess peroxides. The reaction mixture was stirred for an additional 24 hours, filtered and stripped of solvent.

4. Pyrolysis of the Crude Amino N-oxide

The crude amine N-oxides of the terpinolene-N,N-dimethylaminohydrins obtained in the preceding step were placed in a distillation flask and heated in the liquid phase at about 150° for 1 hour. The reaction mixture was then flash distilled under reduced pressure to give material boiling point 80°–88°/3–5 millimeters (88 grams) which was predominantly limonene-4-ol along with a higher boiling alcohol. A high boiling fraction, boiling point 90°–160°/5 millimeters (43 grams) was also obtained. The limonene-4-ol was redistilled over a four-inch vigreaux column to give 78 grams (51 percent of essentially pure material, boiling point 80°–83°/4 millimeters.

The vapor phase chromatography retention time and infrared spectra were identical to a known sample.

5. Hydrogenation of Limonene-4-ol to Terpinene-4-ol

Limonene-4-ol (15.2 grams) was hydrogenated in a Parr low pressure apparatus in 100 cubic centimeters ethanol with 1 gram Raney nickel catalyst (50 p.s.i.g., room temperature) until 0.1 mole hydrogen was absorbed. After filtering off the catalyst and removal of solvent under reduced pressure, terpinene-4-ol (15.3 grams, 99 percent) was obtained with a purity of better than 95 percent. The sample was distilled over a four-inch vigreaux column, boiling point 66°–68°/2 millimeters, and was identical (infrared, nuclear magnetic resonance and vapor phase chromatography retention times) to a known sample.

The synthesis method of the present invention provides terpinene-4-ol of high purity in good yield at relatively low cost. The synthesis involves no stringent purification operations; a single distillation of limonene-4-ol is sufficient to afford a final product of excellent (≈95 percent) purity.

Those modifications and equivalents which fall within the spirit of the invention and the scope of the appended claims are to be considered part of the invention.

I claim:

1. A process for preparing limonene-4-ol which comprises contacting terpinolene with a percarboxylic acid to form terpinolene epoxide, contacting the terpinolene epoxide with an amine selected from the group consisting of diloweralkylamine, pyrrolidine, piperidine and morpholine at about 50° to 250° C. to form an aminohydrin product, contacting the so-formed aminohydrin product with a member selected from the group consisting of hydrogen peroxide, percarboxylic acids and ozone at about −50° to 100° C. to form an amine N-oxide, and decomposing the amine N-oxide to form limonene-4-ol by heating the amine N-oxide at temperatures from about 100° to 200° C.

* * * * *